United States Patent
Tada et al.

(10) Patent No.: US 9,602,042 B2
(45) Date of Patent: Mar. 21, 2017

(54) METHOD OF CONTROLLING ROTATIONAL SPEED OF IMPELLER

(75) Inventors: Shintarou Tada, Yamaguchi (JP); Masayuki Sugimura, Yamaguchi (JP)

(73) Assignee: NISSHIN STEEL CO., LTD. (JP)

( * ) Notice: Subject to any disclaimer, the term of this patent is extended or adjusted under 35 U.S.C. 154(b) by 0 days.

(21) Appl. No.: 13/816,186

(22) PCT Filed: Feb. 29, 2012

(86) PCT No.: PCT/JP2012/055084
§ 371 (c)(1),
(2), (4) Date: Feb. 8, 2013

(87) PCT Pub. No.: WO2012/121078
PCT Pub. Date: Sep. 13, 2012

(65) Prior Publication Data
US 2013/0333521 A1    Dec. 19, 2013

(30) Foreign Application Priority Data

Mar. 8, 2011    (JP) .................... 2011-049827

(51) Int. Cl.
*H02P 29/00* (2016.01)
*C21C 1/02* (2006.01)
*C21C 1/06* (2006.01)
*F27D 27/00* (2010.01)

(52) U.S. Cl.
CPC ............ *H02P 29/00* (2013.01); *C21C 1/02* (2013.01); *C21C 1/06* (2013.01); *F27D 27/00* (2013.01)

(58) Field of Classification Search
CPC   C21C 5/4673; C21C 1/02; C21C 1/06; F27D 27/00; H02P 29/00

USPC .......................................................... 75/375
See application file for complete search history.

(56) References Cited

U.S. PATENT DOCUMENTS 5,275,385 A * 1/1994 Pelton .......................... 266/233

FOREIGN PATENT DOCUMENTS

| CN | 101473527 A | | 7/2009 |
|---|---|---|---|
| JP | 63035903 A | * | 2/1988 |
| JP | S63-035903 A | | 2/1988 |
| JP | 63-35903 A | | 12/1994 |
| JP | H06-335903 A | | 12/1994 |
| JP | 2003-82409 A | | 3/2003 |
| JP | 2003082409 A | * | 3/2003 |

(Continued)

OTHER PUBLICATIONS

International Search Report from the International Bureau of WIPO for International Application No. PCT/JP2012/055084 dated Jun. 12, 2012 (2 pages).

(Continued)

*Primary Examiner* — Jessee Roe
*Assistant Examiner* — Jenny Wu
(74) *Attorney, Agent, or Firm* — Fitch Even Tabin & Flannery LLP

(57) ABSTRACT

A load current value I of a motor rotationally driving an impeller is read out when the impeller is rotated at a predetermined set rotational speed $X_0$, and the rotational speed of the impeller is increased so that the load current value I becomes equal to or larger than a threshold value $I_0$ when it is determined that the load current value I is smaller than the predetermined threshold value $I_0$.

4 Claims, 2 Drawing Sheets

(56) References Cited

FOREIGN PATENT DOCUMENTS

| JP | 2004-35934 A | | 2/2004 |
|----|--------------|---|--------|
| JP | 2004035934 A | * | 2/2004 |
| JP | 2010-132989 A | | 6/2010 |

OTHER PUBLICATIONS

Notification of Office Action issued in counterpart Chinese Application No. 201280001209.9 dated Jul. 18, 2013 (6 pages).
Supplemental European Search Report, date of completion of the search Aug. 27, 2014 for EP 12754352 (6 pages).

* cited by examiner

METHOD OF CONTROLLING ROTATIONAL SPEED OF IMPELLER

CROSS-REFERENCE TO A RELATED APPLICATIONS

This application is a U.S. national phase application filed under 35 U.S.C. §371 of International Application PCT/JP2012/055084, filed on Feb. 29, 2012, designating the United States, which claims priority from Japanese Application 2011-049827, filed on Mar. 8, 2011, which are hereby incorporated herein by reference in their entirety.

FIELD OF THE INVENTION

The present invention relates to a method of controlling the rotational speed of an impeller, and particularly, to a novel improvement that prevents an impeller from being unnecessarily abraded and improves the cycle life of the impeller by increasing the rotational speed of the impeller when a load current value I of a motor rotationally driving the impeller is smaller than a predetermined threshold value $I_0$.

BACKGROUND OF THE INVENTION

In general, in an iron foundry and a steel foundry, a desulfurization treatment is performed between a pig iron making process and a steel making process so as to remove sulfur content (impurity element) causing embrittlement from molten iron. In the desulfurization treatment, a desulfurizing agent such as calcined lime, calcined soda, carbide, caustic soda, and hydrated lime is supplied to a container such as a ladle in which the molten iron is received and is mixed by an impeller (mixing blade) immersed in the molten iron in the container so as to promote the desulfurization reaction therein.

As a structure for performing the desulfurization treatment, for example, a structure disclosed in the JP 2003-82409 A below and the like may be exemplified. That is, in the structure of the related art, an overload reserve amount as a ratio between a heating amount of a current operation and a heating amount when the motor is operated at 100% is estimated from the load current value of the motor rotationally driving the impeller. Then, when the estimated overload reserve amount is smaller than a predetermined threshold value, the rotational speed of the impeller is decreased, so that the impeller is rotated at the maximum rotational speed in which the operation is not stopped due to the overload of the motor. This control is used to prevent the occurrence of defective desulfurization as much as possible by setting the rotational speed of the impeller 3 to a large value.

Further, determination of the rotational speed of the impeller based on an abrasion state empirically estimated from the usage count of the impeller is also carried out although this is a company technique not disclosed as a Patent Document.

SUMMARY OF THE INVENTION

In the structure disclosed in JP 2003-82409 A, since the impeller is rotated at the maximum rotational speed in which the operation is not stopped due to an overload of the motor, the impeller is rotated at the rotational speed greater than the necessary speed in accordance with the performance of the impeller. Further, even when the rotational speed of the impeller is determined based on the empirically estimated abrasion state, there is a tendency that the rotational speed is set to a large value in order to prevent the occurrence of defective desulfurization. Accordingly, in the above-described structures of the related art, the impeller may be unnecessarily abraded, so that the cycle life of the impeller is degraded.

The invention was devised to solve the above-described problems, and it is an object of the invention to provide a method of controlling the rotational speed of an impeller capable of preventing the impeller from being unnecessarily abraded and improving the cycle life of the impeller.

According to the invention, there is provided a method of controlling the rotational speed of an impeller which is used to control the rotational speed of an impeller when molten metal and a desulfurizing agent added to the molten metal are mixed by the impeller immersed in the molten metal, the method including: reading out a load current value I of a motor rotationally driving the impeller when the impeller is rotated at a predetermined set rotational speed $X_0$; and increasing the rotational speed of the impeller so that the load current value I becomes equal to or larger than a threshold value $I_0$ when it is determined that the load current value I is smaller than the predetermined threshold value $I_0$.

According to the method of controlling the rotational speed of the impeller of the invention, a load current value I of a motor rotationally driving the impeller is read out when the impeller is rotated at a predetermined set rotational speed $X_0$, and the rotational speed of the impeller is increased so that the load current value I becomes equal to or larger than a threshold value $I_0$ when it is determined that the load current value I is smaller than the predetermined threshold value $I_0$. Accordingly, since there is no need to set the rotational speed of the impeller to a large value from the first, operation at the appropriate rotational speed may be realized. Therefore, since it is possible to prevent the impeller from being unnecessarily abraded, the cycle life of the impeller may be improved.

DETAILED DESCRIPTION OF THE PREFERRED EMBODIMENTS

Figure 1:
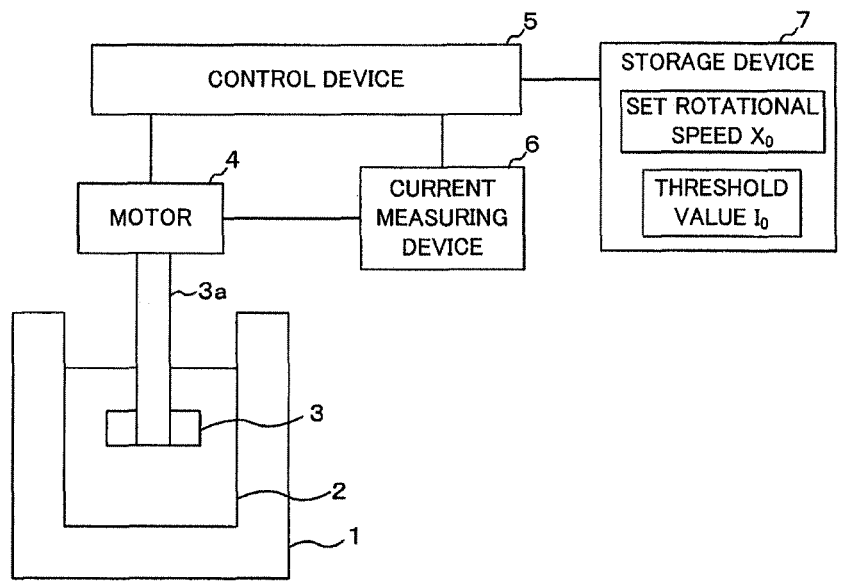
FIG. 1 is a configuration diagram illustrating a mechanical desulfurization device in which a method of controlling the rotational speed of an impeller according to a first embodiment of the invention is performed.

Hereinafter, an embodiment of the invention will be described by referring to the drawings.

First Embodiment

FIG. 1 is a configuration diagram illustrating a mechanical desulfurization device in which a method of controlling the rotational speed of an impeller according to a first embodiment of the invention is performed. In the drawing, molten iron 2 (molten metal) is received in a ladle 1 (container). As widely known, the molten iron 2 is made by a pig iron making process, and contains a sulfur content (impurity element) which causes embrittlement. In order to remove the sulfur content, a desulfurizing agent (not illustrated) such as calcined lime, calcined soda, carbide, caustic soda, and hydrated lime is added to the molten iron 2.

An impeller 3 (mixing blade) which is made of a refractory is immersed into the molten iron 2. A rotary shaft 3a is integrated with the impeller 3, and a motor 4 is connected to the end portion of the rotary shaft 3a. That is, the impeller 3 is rotationally driven by the operation of the motor 4. When the impeller 3 is rotationally driven, the molten iron 2 and the desulfurizing agent are mixed with each other, so that the desulfurization reaction is promoted.

Furthermore, the impeller 3 is used for plural charges, and is abraded with an increase in the number of times of use. Further, the impeller 3 and the motor 4 are supported by an elevation device (not illustrated) so as to be capable of moving up and down, and are moved down to a position where the impeller 3 is immersed in the molten iron 2 when performing the desulfurization treatment of the molten iron 2.

A control device 5 is connected to the motor 4. The control device 5 includes, for example, an inverter, a calculation device (computer), and the like, and controls the rotational speed of the impeller 3 by controlling the operation of the motor 4.

A current measuring device 6 and a storage device 7 are connected to the control device 5. The current measuring device 6 is used to measure the value of a current supplied to the motor 4, that is, a load current value I of the motor 4. The load current value I corresponds to the energy which is consumed to rotate the impeller 3 (the energy which is used by the impeller 3 to mix the molten iron 2 and the desulfurizing agent with each other), and is proportional to the resistance related to the rotation of the impeller 3 inside the molten iron 2 and the rotational speed of the impeller 3. The resistance related to the rotation of the impeller 3 decreases as the impeller 3 is abraded, that is, the mixing capability of the impeller 3 decreases. That is, the mixing capability of the impeller 3 can be checked by comparing the load current value I at the rotational speed serving as a set reference with a predetermined reference value.

The storage device 7 stores a predetermined set number $X_0$ of rotations and a threshold value $I_0$.

The control device 5 reads out a load current value I which is measured by the current measuring device 6 when the impeller 3 is rotated at the set rotational speed $X_0$ stored in the storage device 7. In addition, the load current value I which is read out at this time is an average current value for a predetermined time.

Further, the control device 5 determines whether or not the read load current value I is smaller than the threshold value $I_0$ stored in the storage device 7.

Furthermore, when the control device 5 determines that the load current value I is smaller than the threshold value $I_0$, the control device 5 increases the rotational speed of the impeller 3 so that the load current value I becomes equal to or larger than the threshold value $I_0$.

That is, when the control device 5 detects that the mixing capability of the impeller 3 does not reach a predetermined reference by the comparison between the load current value I and the threshold value $I_0$, the control device 5 makes up for a decline in the mixing capability by increasing the rotational speed of the impeller 3. Accordingly, since there is no need to set the rotational speed of the impeller 3 to a large value from the first, the operation at the appropriate rotational speed may be realized. Therefore, since it is possible to prevent the impeller 3 from being unnecessarily abraded, the cycle life of the impeller 3 may be improved.

Here, the threshold value $I_0$ is set to the lower limit value of the load current value I in which the defective desulfurization does not occur. That is, as described above, when the rotational speed of the impeller 3 is increased so that the load current value I becomes equal to or larger than the threshold value $I_0$, the rotational speed of the impeller 3 may be set to the minimum rotational speed in which the defective desulfurization does not occur. Accordingly, the operation at the low rotational speed may be further reliably performed. In addition, such lower limit value depends on the desulfurization condition including the inner diameter of the ladle 1, the amount of the molten iron 2, the immersion depth of the impeller 3, and the capacity of the motor 4, but may be obtained by the comparison with the desulfurization efficiency while measuring the load current value I of the motor 4.

The control device 5 reads out the load current value I after a predetermined standby time elapses from the time when the rotational speed of the impeller 3 reaches the set rotational speed $X_0$. This is because the determination precision of the mixing capability is improved by using the load current value I when the mixing state is stabilized at the set rotational speed $X_0$.

Further, when the control device 5 determines that the load current value I is smaller than the threshold value $I_0$, the control device 5 increases the rotational speed of the impeller 3 by a predetermined fixed value $\Delta X$. This is because the abrasion of the impeller 3 is a gentle shift and the amount by which the load current value I is smaller than the threshold value $I_0$ may be estimated in advance. In this way, since it is possible to simplify the calculation program by setting the increase amount to the fixed value $\Delta X$, the equipment costs may be reduced.

Further, if the control device 5 increases the rotational speed of the impeller 3, the control device 5 updates the set rotational speed $X_0$ stored in the storage device 7 to the increased rotational speed. If the set rotational speed $X_0$ is fixed, there is a case where the mixing capability is determined by the rotational speed largely deviated from the appropriate rotational speed in response to the abrasion state at the time point when the impeller 3 is abraded. In this case, sufficient mixing may not be performed until the rotational speed reaches the appropriate rotational speed, which causes insufficient desulfurization. That is, since the set rotational speed $X_0$ is updated, the effective mixing may be performed until the determination of the mixing capability ends, and hence the occurrence of insufficient desulfurization may be prevented.

In addition, when the impeller 3 is replaced, a reset signal is input to the control device 5 in response to, for example, the operation and the like of the operator. When the control device 5 detects the replacement of the impeller 3 based on the reset signal, the control device 5 resets the set rotational speed $X_0$. In other words, the updated set rotational speed $X_0$ is continuously used until the impeller 3 is replaced.

Figure 2:
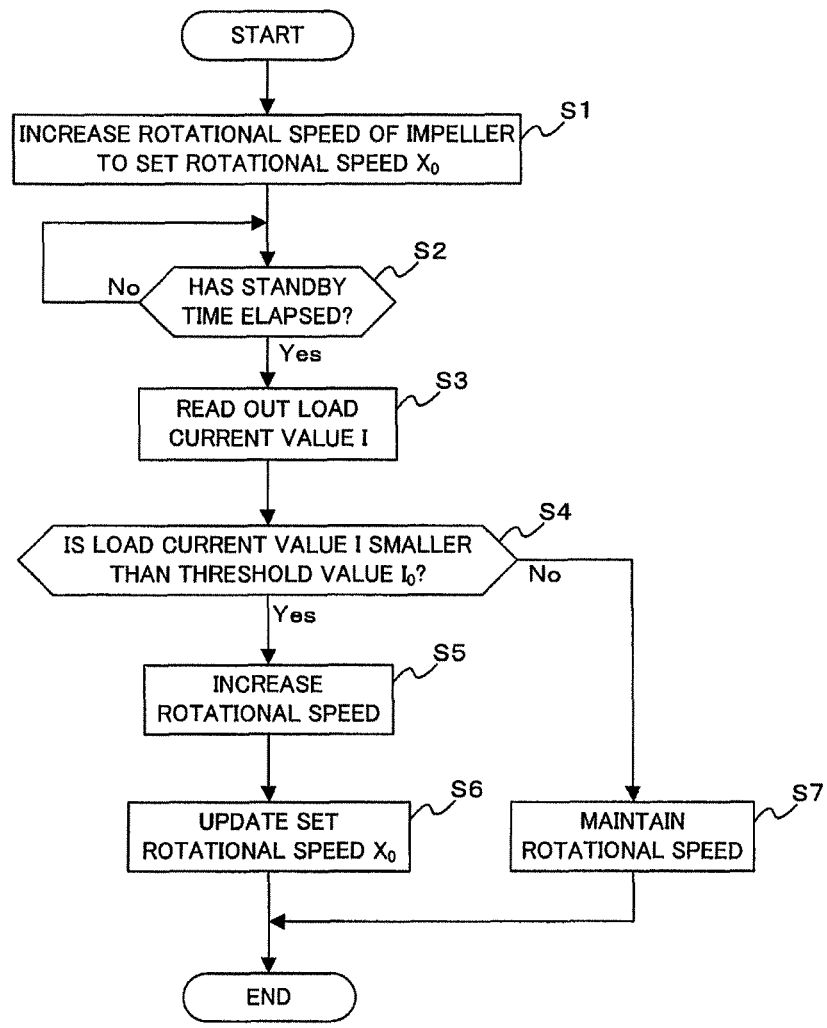
FIG. 2 is a flowchart illustrating an operation of controlling the rotational speed of an impeller which is performed by a control device of FIG. 1.

Next, FIG. 2 is a flowchart illustrating the operation of controlling the rotational speed of the impeller 3 which is performed by the control device 5 of FIG. 1, which illustrates the method of controlling the rotational speed of the impeller of the embodiment. In the drawing, when the impeller 3 is immersed in the molten iron 2, the rotational speed of the impeller 3 is increased to the set rotational speed $X_0$ stored in the storage device 7 in response to the operation control of the motor 4 by the control device 5 (step S1). At this time, when a desulfurizing agent is added to the molten iron 2 and the rotational speed of the impeller 3 reaches the set rotational speed $X_0$, the control device 5 determines whether or not a predetermined standby time elapses from the time when the rotational speed of the impeller 3 reaches the set rotational speed $X_0$ (step S2), and after it is determined that the standby time has elapsed, the load current value I measured by the current measuring device 6 is read out by the control device 5 (step S3).

Next, the control device 5 determines whether or not the load current value I is smaller than the threshold value $I_0$ stored in the storage device 7 (step S4). At this time, when it is determined that the load current value I is smaller than the threshold value $I_0$, it is detected that the mixing capability of the impeller 3 is degraded due to the abrasion, and the rotational speed of the impeller 3 is increased so that the load current value I becomes equal to or larger than the threshold value $I_0$ (step S5). In addition, since the amount by which the load current value I is smaller than the threshold value $I_0$ may be estimated in advance, the increase amount in the rotational speed of the impeller 3 is set to a predetermined fixed value $\Delta X$. Further, the threshold value $I_0$ is set to the lower limit value of the load current value I in which the defective desulfurization does not occur, and the increased rotational speed becomes the small rotational speed in which the defective desulfurization does not occur in response to the abrasion state of the impeller 3 at the time point. When the rotational speed of the impeller 3 increases, the set rotational speed $X_0$ stored in the storage device 7 is updated to the increased rotational speed by the control device 5 (step S6).

Here, when it is determined that the load current value I is equal to or larger than the threshold value $I_0$, it is detected that the mixing capability of the impeller 3 reaches a predetermined reference, so that the mixing operation is maintained at the set rotational speed $X_0$ (step S7). That is, the increasing of the rotational speed of the impeller 3 (step S5) and the updating of the set rotational speed $X_0$ (step S6) are not performed.

This operation of controlling the rotational speed is repeatedly performed until a predetermined mixing time elapses from the time when the mixing using the impeller 3 starts. Further, the operation of controlling the rotational speed ends at the time point when the mixing time has elapsed. In addition, even when the operation of controlling the rotational speed ends, the set rotational speed $X_0$ stored in the storage device 7 is maintained. That is, when the set rotational speed $X_0$ is updated, the rotational speed of the impeller 3 is increased to the updated set rotational speed $X_0$ immediately after the start of the mixing at the subsequent charge. The set rotational speed $X_0$ is reset when the impeller 3 is replaced.

Next, an example will be described. The applicant performed a desulfurization treatment using a mechanical desulfurization device having the specification illustrated in Table 1 before the converter charging after ejecting stainless hot metal obtained by an electric furnace. The stainless hot metal was composed of iron and impurities and included Cr of 10 wt % to 30 wt %, Ni of 0 wt % to 20 wt %, carbon of 2 wt % to 4 wt %, and the remainder including Si, Cu, and Mo.

TABLE 1

| TYPE | IMPELLER CANTILEVERED ROTATION TYPE |
|---|---|
| CAPACITY | 80 T |
| DRIVING MOTOR | CAPACITY OF DRIVING MOTOR: 200 KW |
| ROTATION IMPELLER | ROTATIONAL SPEED: max. 150 rpm |
| REFRACTORY | MATERIAL: Al$_2$O$_3$-BASED CASTABLE MAXIMUM DIAMETER: 1200 mm |
| DESULFERIZING AGENT | CALCINED LIME |
| SPECIFIC CONSUMPTION OF DESULFERIZING AGENT | 8 TO 11 kg/T |
| MIXING TIME | 10 MINUTES |

In addition, the respective setting values used in the control of the rotational speed of the impeller 3 of the embodiment were as below.

Initial value of set rotational speed $X_0$: 70 rpm
Threshold value $I_0$: 150 A
Fixed value $\Delta X$: 10 rpm
Standby time: 3 minutes
Current measuring time: 10 seconds Further, the applicant also performed a conventional desulfurization operation (desulfurization operation with empirically set rotational speed) as a comparative example. Then, the applicant respectively examined the transition of the rotational speed of the impeller 3, the desulfurization rate ((sulfur amount [wt %] before desulfurization−sulfur amount [wt %] after desulfurization)/sulfur amount [wt %] before desulfurization×100 [%]), and the cycle life of the impeller were examined in cases where the control of the rotational speed of the embodiment was performed and where the conventional desulfurization operation was performed.

Figure 3:
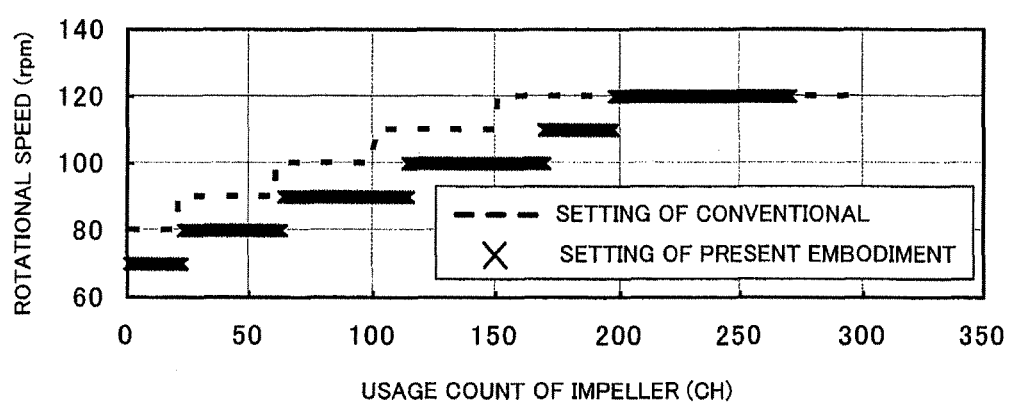
FIG. 3 is a graph illustrating a transition of the rotational speed of the impeller when the operation of controlling the rotational speed of FIG. 2 is performed.

First, the rotational speed of the impeller 3 will be illustrated. FIG. 3 is a graph illustrating a transition of the rotational speed of the impeller 3 when the operation of controlling the rotational speed of FIG. 2 was performed. In the drawing, the vertical axis indicates the rotational speed of the impeller 3, and the horizontal axis indicates the usage count of the impeller 3 (the number of charges). As illustrated in the drawing, the rotational speed of the impeller 3 when the control of the rotational speed of the present embodiment was performed was smaller than the conventional empirically set rotational speed until the usage count of the impeller becomes 200 CH.

Next, the examination results of the desulfurization rate and the cycle life of the impeller are illustrated in the following Table 2.

TABLE 2

| ITEM | CONVENTIONAL | PRESENT INVENTION |
|---|---|---|
| AVERAGE DESULFERIZATION RATE (%) | 72.9% | 85.5% |
| AVERAGE SPECIFIC CONSUMPTION OF DESULFERIZING AGENT (kg/T) | 9.4 kg/T | 9.4 kg/T |
| CYCLE LIFE | 184 CH | 271 CH |

As illustrated in Table 2, compared to the average desulfurization rate of the desulfurization operation of the related art, the average desulfurization rate increases by 12.6% when performing the control of the rotational speed of the embodiment. This is because the satisfactory shape of the impeller 3 was maintained until the large usage count by setting the set rotational speed $X_0$ of the impeller 3 to the minimum rotational speed in which the defective desulfurization does not occur. In addition, the average specific consumption of the desulfurizing agent illustrated in Table 2 indicates the average value of the used amount of the desulfurizing agent (kg-desulfurizing agent/Ton-hot metal) used in the desulfurization operation during a period in which one impeller is continuously used. Here, the desulfurization performance may be also changed in accordance with the amount of the desulfurizing agent used. However, since the average specific consumption of the desulfurizing agent in the operation of the present invention and the operation of the related art are the same, it is found that the improvement in the average desulfurization rate is not caused by the used amount of the desulfurizing agent.

Further, in the desulfurization operation of the related art, the impeller 3 needs to be replaced when the impeller 3 is used up to 184 CH. However, in the case of the control of the rotational speed of the present embodiment, the impeller 3 may be continuously used up to 271 CH. From this result, it is found that the desulfurization rate and the cycle life of the impeller may be improved by performing the control of the rotational speed of the present embodiment and hence an economic and effective desulfurization operation may be realized.

In the method of controlling the rotational speed of the impeller 3, the load current value I of the motor 4 rotationally driving the impeller 3 is read out when the impeller 3 rotates at the predetermined set rotational speed $X_0$, and when it is determined that the load current value I is smaller than the predetermined threshold value $I_0$, the rotational speed of the impeller 3 is increased so that the load current value I becomes equal to or larger than the threshold value $I_0$. Accordingly, since there is no need to set the rotational speed of the impeller 3 to a large value from the first, operation at the appropriate rotational speed may be realized. Therefore, the impeller 3 may be prevented from being unnecessarily abraded, and the cycle life of the impeller 3 may be improved.

Further, since the threshold value $I_0$ is the lower limit value of the load current value I in which the defective desulfurization does not occur, the rotational speed of the impeller 3 may be set to the minimum rotational speed in which the defective desulfurization does not occur, and hence operation at the smaller rotational speed may be further reliably performed.

Furthermore, since the load current value I is read out after it is determined that the predetermined standby time has elapsed from the time when the rotational speed of the impeller 3 reaches the set rotational speed $X_0$, the load current value I when the mixing state is stabilized at the set rotational speed $X_0$ may be used, and hence the determination precision of the mixing capability may be improved.

Further, since the amount of increase of the rotational speed is the predetermined fixed value $\Delta X$, the calculation program may be simplified, and hence the equipment costs may be reduced.

Furthermore, the set rotational speed $X_0$ is updated to the increased rotational speed when the rotational speed of the impeller 3 increases, the effective mixing may be performed until the determination of the mixing capability ends, and hence the occurrence of insufficient desulfurization may be prevented.

In addition, in the first embodiment, a case has been described in which the rotational speed of the impeller 3 is increased by the predetermined fixed value $\Delta X$ when it is determined that the load current value I is smaller than the threshold value $I_0$, but the amount by which the rotational speed of the impeller 3 is increased may be determined based on the difference value between the load current value I and the threshold value $I_0$. Specifically, the rotational speed of the impeller 3 is increased so that the difference value becomes 0. In this way, when the amount of increase is determined based on the difference value, the control of the rotational speed may be performed even more finely.

The invention claimed is:

1. A method of controlling the rotation speed of an impeller for optimizing the cycle life of the impeller used in a desulfurization operation, the method comprising:
   immersing the impeller in molten iron having a desulfurizing agent added thereto; setting a rotational speed of the impeller at a minimum predetermined set rotational speed Xo corresponding to a predetermined threshold value Io of a load current value I of a motor driving the impeller for rotation, the predetermined threshold value Io corresponding to a lower limit of the load current value at which an effective desulfurization operation occurs;
   operating the motor to cause the impeller to rotate until the impeller reaches the predetermined set rotational speed Xo;
   reading out the load current value I of the motor with the motor driving the impeller at the current predetermined set rotational speed Xo;
   maintaining the rotational speed of the impeller at the current predetermined set rotational speed Xo when the load current value I is larger than the predetermined threshold value Io,
   increasing the rotational speed of the impeller if the load current value I is less than the predetermined value Io with the increase in the rotational speed being sufficient to increase the load current value I to be equal to or larger than the predetermined threshold value Io, the predetermined set rotational speed Xo being updated to the increased rotational speed when the rotational speed of the impeller is increased.

2. The method of controlling the rotational speed of the impeller according to claim 1, wherein the load current value I is read out after it is determined that a predetermined standby time elapses from the time when the rotational speed of the impeller reaches the set rotational speed $X_0$.

3. The method of controlling the rotational speed of the impeller according to claim 1, wherein an amount of increase of the rotational speed is a predetermined fixed value $\Delta X$.

4. The method of controlling the rotational speed of the impeller according to claim 1, wherein an amount of increase of the rotational speed is determined based on a difference value between the load current value I and the threshold value $I_0$.

* * * * *